United States Patent [19]
Mitchell et al.

[11] 3,981,088
[45] Sept. 21, 1976

[54] SLIPPER-BOOT

[75] Inventors: James G. Mitchell; Winalee G. Mitchell, both of Perrysburg; Paul D. Purdy, Waterville, all of Ohio

[73] Assignees: James G. Mitchell; Winalee G. Mitchell, both of Perrysburg, Ohio

[22] Filed: Jan. 21, 1975

[21] Appl. No.: 542,750

[52] U.S. Cl. ................................................. 36/87
[51] Int. Cl.² ........................................... A43B 7/14
[58] Field of Search ................. 36/2.5 R, 4, 10, 9 R, 36/7.3, 87

[56] References Cited
UNITED STATES PATENTS

| | | | |
|---|---|---|---|
| 1,537,778 | 5/1925 | Nyhagen | 36/10 |
| 1,716,346 | 6/1929 | Rice | 36/7.3 |
| 1,771,726 | 7/1930 | Valentine et al. | 36/7.3 |
| 3,426,454 | 2/1969 | Mitchell et al. | 36/2.5 R |
| 3,742,623 | 7/1973 | Groothaert | 36/7.3 |

Primary Examiner—Patrick D. Lawson
Attorney, Agent, or Firm—Pollock, Vande Sande & Priddy

[57] ABSTRACT

Slipper-boots made of synthetic polymeric foam sheeting material comprise an upwardly flared foot-receiving throat having an upper opening with a first perimetral length to provide excess material for stress distribution and a lower opening having a second, smaller perimetral length to grip the wearer's ankle. Gussetted bottom soles also may be provided for additional width. An apparatus and method for making such slipper-boots comprise means or steps for simultaneously forming the heel of a leading slipper and the toe of a following slipper across an intermittently moving folded band of material, whereby slipper size may be varied by altering the time of movement of the folded band of material between formations of the slipper-boot heels and toes. Material folding means are also disclosed.

5 Claims, 16 Drawing Figures

U.S. Patent Sept.21, 1976 Sheet 1 of 5 3,981,088

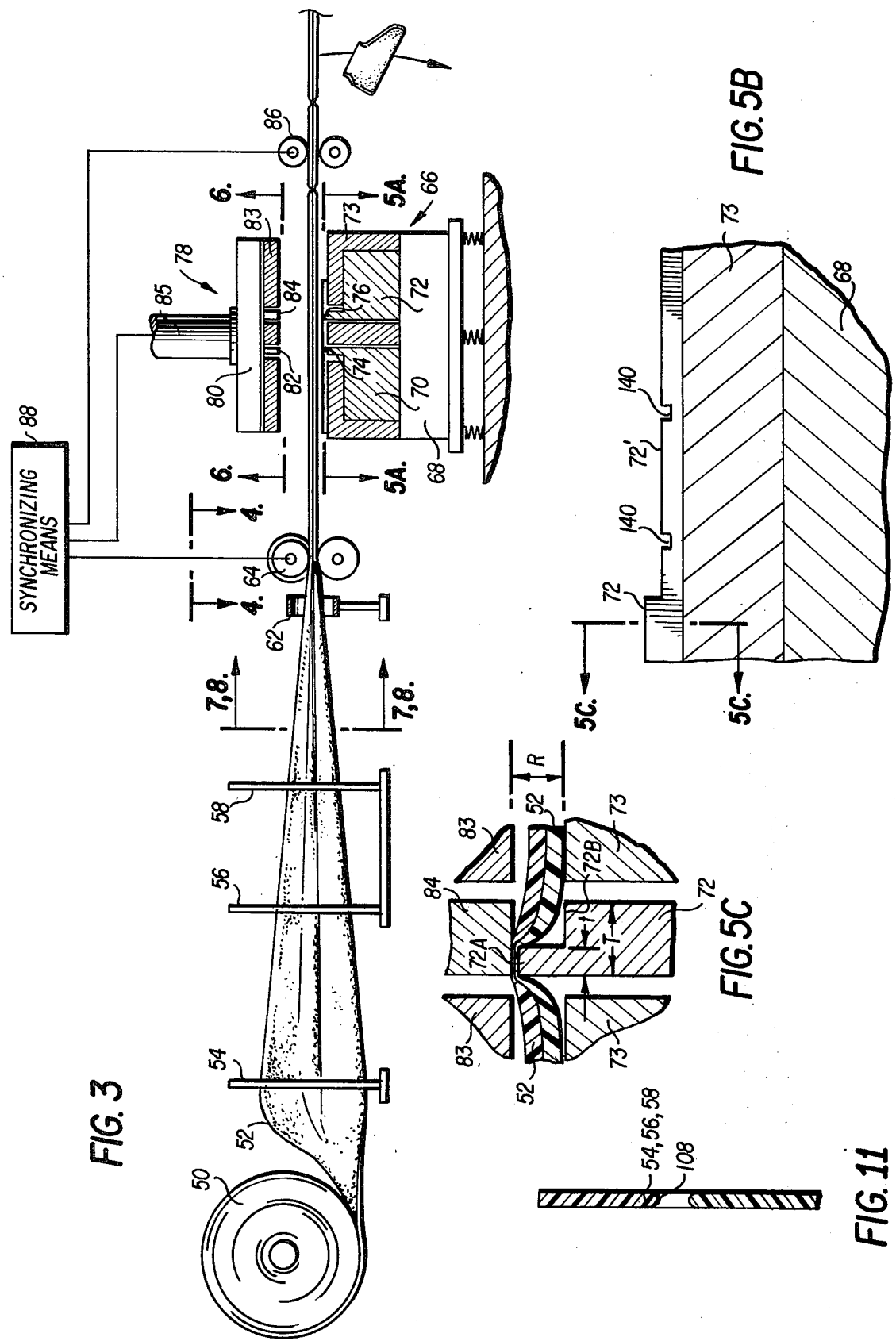

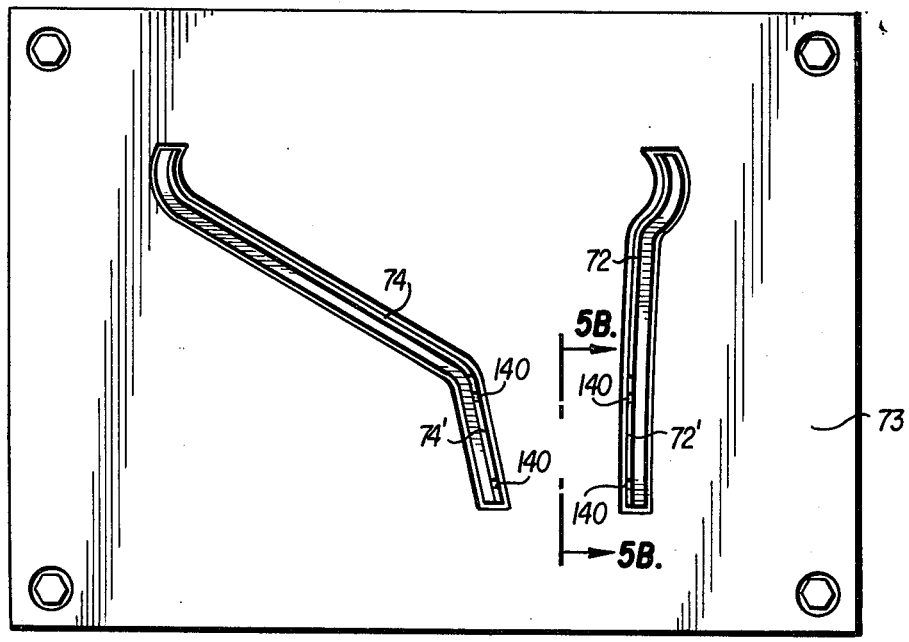
FIG. 5A
FIG. 6
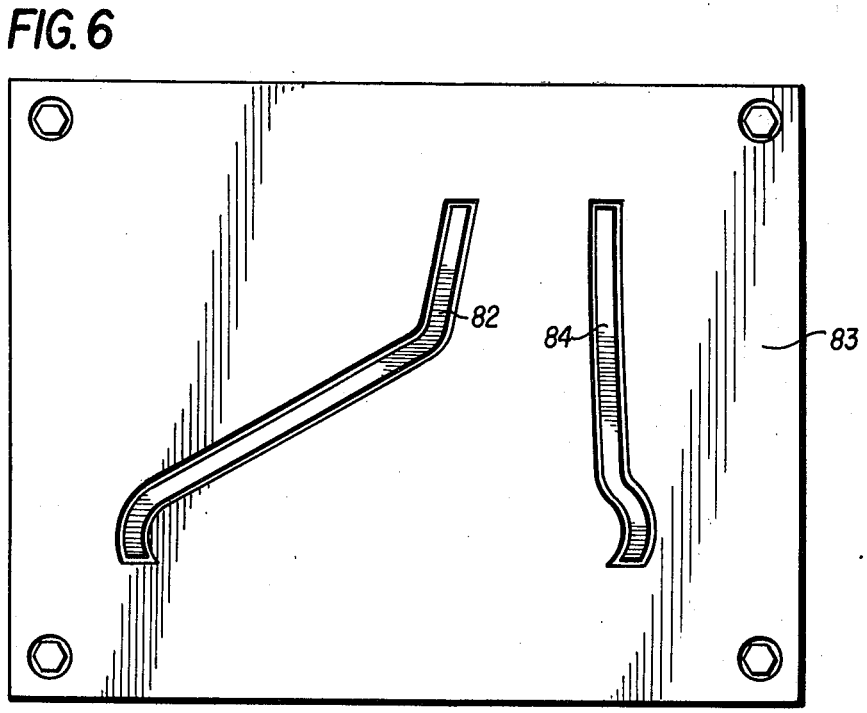

SLIPPER-BOOT

BACKGROUND OF THE INVENTION

This invention relates to slipper-boots having improved resistance to tearing and reduced tendency for slipping, which are formed from foamed synthetic polymeric or elastomeric sheeting material. More particularly, the invention relates to a slipper-boot of such material which has longitudinal seams running up its heel and toe portions to its foot-receiving throat and to means for minimizing tearing of the material adjacent such seams. An improved apparatus and method for making such slipper-boots also comprise part of this invention.

In the past, there has been a need for strong, sanitary and inexpensive footwear and for methods and apparatus for manufacturing such articles. To a great extent, U.S. Pat. No. 3,426,454 has met this need by disclosing slippers comprised of two bands of synthetic polymeric sheeting material heat-sealed to each other along a seam extending from the forward edge of the foot opening, along the upper toe of the slipper, back along the sole to the heel and up the heel to the foot opening. To reduce tearing of the material along the seam due to stresses generated when the slipper is donned, the front and rear edges of the foot opening are oriented to meet the seam at an angle.

Although slippers made in accordance with the teachings of this patent have exhibited substantial tear resistance relative to prior art devices, some difficulties have been experienced. For example, the presence of the seam on the slipper sole has resulted in some increase in the tendency of slippers to skid on very smooth surfaces which can present a substantial hazard for some users. Also, the use of two flat blanks heat-sealed along the slipper sole provides little excess material to accomodate wider feet; thus, slipper failure due to excessive stretching on such feet has been noted. Finally, the slippers of U.S. Pat. No. 3,426,454 occasionally tend to slip off the wearer's heel, apparently due to their rather low heel or to a lack of width in the sole.

In view of the above, it is clear that a need exists for simple, inexpensive, sanitary slippers of a type which exhibits high resistance to tearing of the material, to skidding on smooth surfaces and to inadvertent slipping from the wearer's heel.

OBJECTS OF THE INVENTION

An object of the invention is to provide a slipper-boot which is inexpensive, sanitary and easy to manufacture, yet has good resistance to tearing of the material.

Another object of the invention is to provide a slipper-boot having an improved foot-receiving throat which includes some excess material around its upper edge to minimize tearing and a constricted opening below the upper edge to minimize slipping from the wearer's foot.

A further object of the invention is to provide a slipper-boot having an expansible sole to accomodate wider feet and minimize tearing.

Still another object of the invention is to provide a slipper-boot having no longitudinal sole seam, whereby improved comfort and resistance to slippage are attained.

Yet another object of the invention is to provide a simple method and an apparatus for manufacturing such slipper-boots.

These objects of the invention are intended to be only exemplary; thus, other improved characteristics and advantages inherently achieved by the invention may occur to those skilled in the art; however, the scope of the invention is to be limited only by the appended claims.

SUMMARY OF THE INVENTION

Some of the above objects are attained by the slipper-boot according to the invention which may be manufactured from a single sheet of synthetic polymeric sheeting material. The slipper-boot comprises an elongated sole portion having forward and rear ends and generally upright side portions integral with the sole portion and extending upwardly therefrom. The side portions have forward, rear and top edges. The forward edges are joined by a toe seam which extends generally upwardly and rearwardly from the sole portion to a first location below the top edge and then curves to extend forwardly and upwardly to meet the top edge. The rear edges are joined by a heel seam which extends generally upwardly and forwardly from the sole portion to a location below the top edges and then curves to extend rearwardly and upwardly to meet the top edges. At the point where the toe and heel seams intersect the top edges, an angle is defined. In one embodiment, the slipper-boot according to the invention may include at least one gusset fold located lengthwise in the sole portion.

The method according to the invention may comprise the steps of dispensing an elongated sheet of synthetic polymeric sheeting material and folding the moving sheet generally upon itself to form at least one longitudinal gusset fold therein. After the folding operation, the folded sheet is drawn through a heat-sealing station wherein a heel seam of a first slipper-boot and a toe seam of a second slipper-boot are formed which extend essentially laterally of the folded sheet from the longitudinal gusset fold. This operation is then repeated to form a plurality of slipper-boots in the folded sheet.

The apparatus according to the invention comprises means for dispensing a continuous, elongated sheet of synthetic polymeric sheeting material, the sheet being drawn through a means for folding it generally upon itself to form at least one longitudinal gusset fold therein. Means are arranged adjacent the folded sheet for providing longitudinally spaced heel seams for a leading slipper-boot and toe seams for a following slipper-boot, the seams extending essentially laterally of the folded sheet from the longitudinal gusset fold. Novel material folding means may also be included.

BRIEF DESCRIPTION OF THE DRAWINGS

FIG. 3 shows an elevation view, partially in section of the apparatus for manufacturing slipper-boots according to the invention.

FIG. 5A shows a view taken along line 5A—5A of FIG. 3, indicating the appearance of the lower heat-sealing die according to the invention.

FIG. 5B shows a view taken along line 5B—5B of FIG. 5A, indicating the geometry of the toe and heel portions of the lower heat-sealing die according to the invention. j FIG. 5C shows a view taken along line 5C—5C of FIG. 5B, also including the upper heat-sealing die elements, and showing the orientation of the folded material band during heat-sealing.

FIG. 6 shows a view taken along line 6—6 of FIG. 3, indicating the geometry of the upper heat-sealing die.

FIG. 11 shows a view taken along line 11—11 of FIG. 10, indicating the geometry of the material folding slots.

DETAILED DESCRIPTION OF THE PREFERRED EMBODIMENTS

Figure 1:
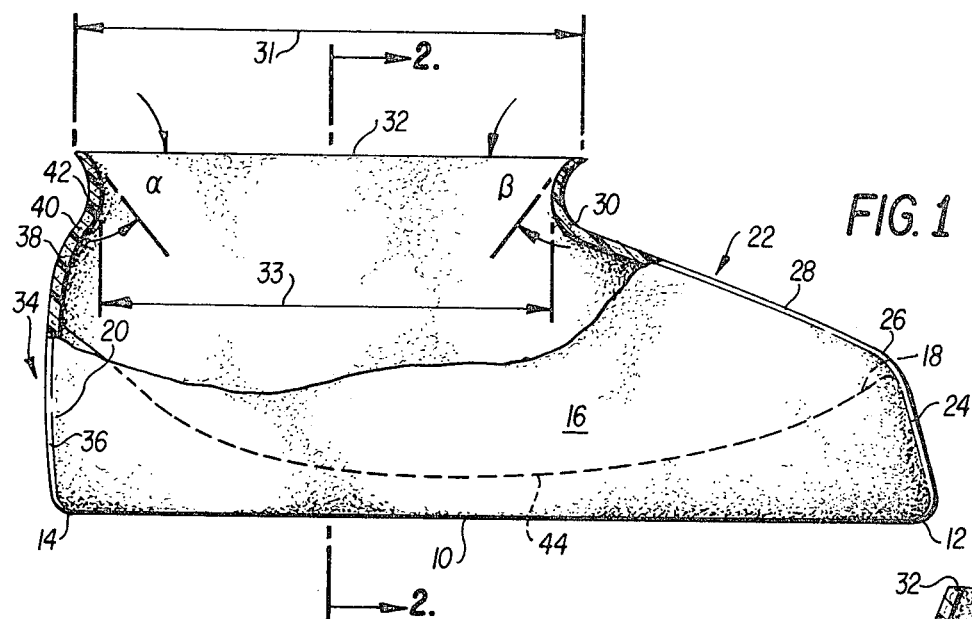
FIG. 1 shows a side elevation view of a slipper-boot according to the invention.

There follows a detailed description of the preferred embodiments of the invention, reference being had to the drawings in which like reference numerals identify like elements of structure in each of the several Figures.

Figure 2A:
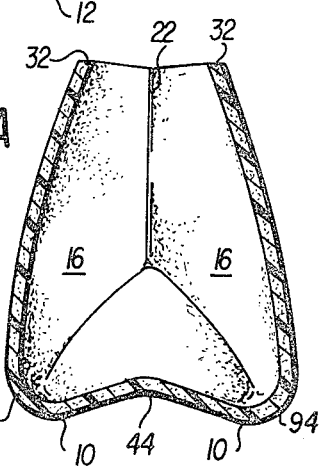
FIG. 2A shows a view taken along line 2—2 of FIG. 1, when the slipper-boot is in its relaxed, open position.
Figure 2B:
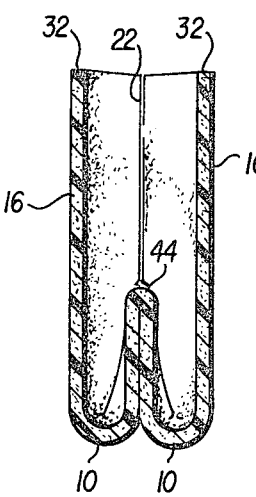
FIG. 2B shows a view taken along line 2—2 of FIG. 1, when the slipper-boot is in its compressed, closed condition.

Referring now to FIGS. 1, 2A and 2B, the slipper-boot according to the invention may be seen to comprise an elongated sole portion 10 having a forward end 12 and a rear end 14. Side portions 16 integral with sole portion 10 extend generally upwardly therefrom and include forward edges 18 and rear edges 20. Forward edges 18 are joined by a toe seam 22 which includes a first upward portion 24 extending rearwardly at a slight angle from vertical to a point 26 at an elevation above elongated sole portion 10 chosen to provide comfortable clearance for the wearer's toes. From point 26, seam 22 includes a second upward portion 28 extending rearwardly at a greater angle from vertical to a point 30 situated approximately above the location at which the wearer's instep will be located when the slipper is worn. From point 30, seam 22 then turns on a radius, forwardly through an essentially circular arc to meet top edge 32 of the slipper-boot at an acute angle $\beta$. In one embodiment of the invention, an arc at approximately 180° and a radius of approximately one-half inch were found to be acceptable at this location, although no limitation is intended thereby.

Similarly, a heel seam 34 joins rear edges 20 of side portions 16. Heel seam 34 includes a first upward portion extending forwardly at a very slight angle from vertical to a point 38 chosen to provide a comfortable fit for the wearer's heel and from point 38 a second upward portion 40 extends forwardly at a somewhat greater angle from vertical to a point 42 located approximately opposite to point 30 on toe seam 22. Heel seam 34 then curves on a radius rearwardly through an arc to meet upper edge 32 of side portions 16 at an acute angle $\alpha$. The arc and radius are generally equal at both the toe and heel of the slipper-boot.

Angles $\alpha$ and $\beta$ need not be particularly acute and may closely approach a right angle where there is curvature in both the toe or heel seam and the upper edges of the side portions where they meet. When the slipper-boot is worn, the acute angle may not even be visible due to stretching or deflection of the material. Thus, the acute angle is best viewed from the side while the slipper is not being worn and while its sides are flattened against one another. In some instances, it may be desirable for appearance to use an angle $\alpha$ or $\beta$ of greater than 90°. This is acceptable, so long as the material on one side or the other of the angle is curved to provide extra material to absorb stretching strains when the slipper is in use, thereby minimizing seam failure.

The provision of the curved portions of seams 22 and 34 improves the wearability and resistance to tearing of the slipper-boots according to the invention. Due to the angled intersection of the seams and upper edges 32, additional material is provided in the area of the top ends of the seams, which increases resistance to tearing, as discussed above. The additional material also provides a flared foot-receiving throat having an upper opening 31 defined by upper edges 32 and a constricted, ankle-gripping opening 33 defined at the level of the curved portions of seams 22 and 34. The upper opening facilitates initial insertion of the wearer's foot and provides more resistance to tearing; whereas, the lower opening grips the wearer's ankle to prevent the slipper-boot from slipping easily from the wearer's foot.

As used in this specification, synthetic polymeric sheeting material refers to any material resembling synthetic rubber in its properties. That is, the material is flexible, stretchy and preferably is cellular or spongy through its thickness. Commonly available polyurethane foams are useful in the invention, such as those made by "blowing" a polyester resin with the aid of a diisocyanate compound. Other compounds such as vinyl may also be used. One skilled in the art will realize that multiple ply bands of such materials may also be used without departing from the spirit of the invention, such as an outer polyurethane foam layer having an inner, synthetic fiber cloth bonded thereto.

Referring particularly to FIGS. 2A and 2B, the interior geometry of the slipper-boot according to the invention may be more clearly understood. Elongated sole portion 10 includes at least one longitudinal gusset fold 44 which extends upwardly into the interior of the slipper-boot along the axis thereof. Those skilled in the art will realize that additional gusset folds may be provided for more width. When the slipper is worn, gusset fold 44 flattens to the floor, as indicated in FIG. 2A, to provide adequate width in sole portion 10 for the wearer's foot. As indicated in phantom in FIG. 1, gusset fold 44 extends the full length of the slipper, with its forward and rear vertical edges being joined by toe seam 22 and heel seam 34 between points 12 and 26 and 14 and 38, respectively. When the slipper-boot is pressed flat for storage, gusset fold 44 retracts into the center of the slipper as shown in FIG. 2B; otherwise, it opens laterally of the slipper to assume the configurations shown in FIG. 1 (phantom) and FIG. 2A.

FIG. 3 shows an elevation view, partially in section, of the slipper-boot manufacturing apparatus according to the invention. A roll 50 of synthetic polymeric sheeting material is mounted for dispensing a band of this material which is then drawn through folding guides 54, 56 and 58, after which it may pass through an angularly adjustable flow guide 62 and through the combined infeed roller and material edge trimmer 64. Then, the folded band of material 52 passes into heat-sealing die press 66. Die press 66 comprises a spring mounted base plate 68 having on an upper surface thereof heated blocks 70 and 72 which respectively include upwardly extending die face 74 shaped to produce toe seam 22 and upwardly extending die face 76 shaped to produce heel seams 34. Die faces 72 and 74 extend above and are spaced from surrounding plate 73. Folded band 52 passes over upwardly extending die faces 74 and 76 and beneath upper movable die member 78. Die member 78 comprises a heated block 80 which includes on a lower surface thereof downwardly extending die face 82 shaped to form toe seam 22 and downwardly extending die face 84 shaped to form heel seam 34. Die faces 82 and 84 are flush with and spaced from surrounding plate 83. The geometry of die faces 74, 76, 82 and 84 will be discussed in greater detail with respect to FIGS. 5A, 5B, 5C and 6. An actuator shaft 85 is attached to movable die member 78 for bringing the die faces into contact for toe and heel seam formation.

After the slipper-boot seams have been formed, folded band 52, including the completed slipper-boots, is drawn from die press 66 through outfeed rollers 86. Outfeed rollers 86 are driven at from 5 to 15% higher rate of speed than infeed rollers 64 to maintain a slight stretch in folded band 52, thereby minimizing undesirable wrinkling in the completed slippers due to relaxation of the material prior to formation of the toe and heel seams. An 8% differential is preferred. A synchronizing mechanism 88 coordinates the operation of infeed rollers 64, outfeed rollers 86 and die press 66. Such synchronizing may be easily obtained through the use of electric rotary switch timer clocks or electronic sequence timers, hydraulic and/or pneumatic pumps, solenoid valves, limit switches and related control apparatus with thich those skilled in the art are familiar. Thus, the synchronizing mechanism 88 has been shown only schematically. The sequence of operation controlled by mechanism 88 will be discussed subsequently.

Figure 4:
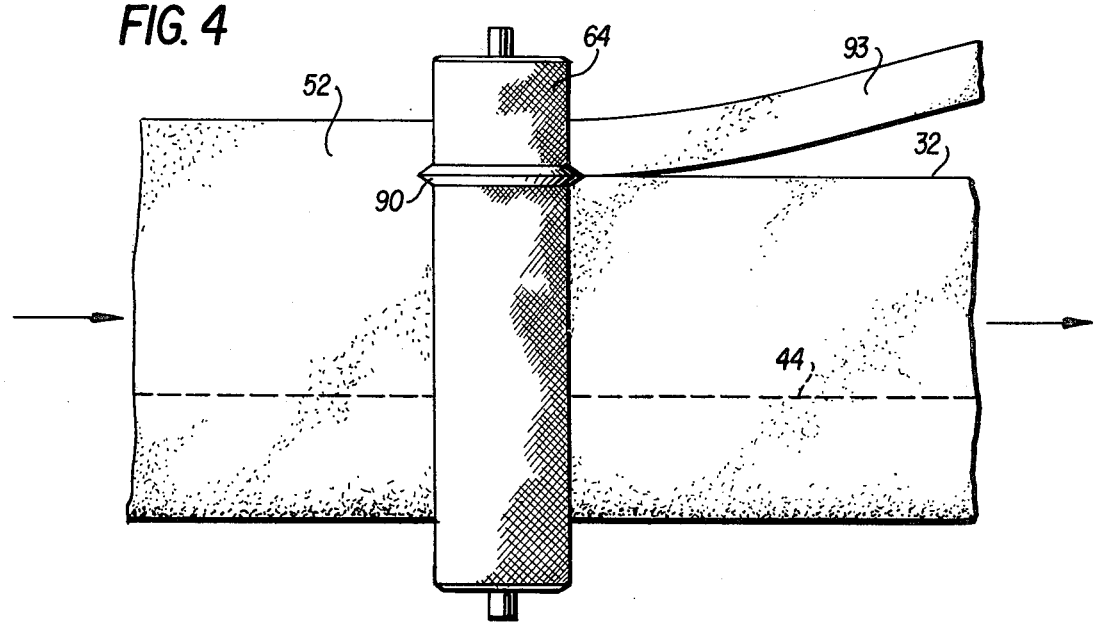
FIG. 4 shows a view taken along line 4—4 of FIG. 3, indicating the cooperation between the combined infeed rollers and material trimming knife and the folded band of material.

FIG. 4 shows the folded band of material 52 after gusset fold 44 has been formed, as the folded band passes through combined infeed roller and material edge trimmer 64. As indicated, infeed roller and material edge trimmer 64 includes knurled rollers which comprise an integral circumferential blade 90 on one roller and a mating groove 92 (see FIG. 10) on the other roller. The knurling on the rollers provides adequate frictional engagement between the folded band of material and the rollers. Outfeed rollers 86 may likewise be knurled. The blade 90 and groove 92 cooperate to trim the edges of the folded band 52 to provide a folded band of a preselected height as necessary for side portions 16 of a particular slipper-boot size. A strip of scrap material 93 is fed through die press 66 and outfeed rollers 86 for subsequent disposition.

FIGS. 5A, 5B and 5C show plan and section views of the lower die faces 72 and 74. FIG. 6 shows a plan view of upper die faces 82 and 84. Die faces 74 and 82 are shaped to produce the toe seam 22, illustrated in FIG. 1; and die faces 72 and 84 are shaped to produce the heel seam 34, also shown in FIG. 1. In practice, it has been found desirable to size the die faces 72, 74, 82 and 84 to be somewhat longer from top to bottom, as seen in FIGS. 5A and 6, than the desired height of side portions 16 of a particular slipper. This additional height allows for some shifting of the folded and trimmed band 52 as it moves from infeed rollers 64 through die press 66 and out through outfeed rollers 86, while still ensuring that toe seams 22 and 34 will extend entirely across the folded band from sole portion 10 to upper edges 32.

FIG. 5B shows an elevation section taken along line 5B—5B of FIG. 5A, indicating the geometry of lower heat-sealing dies 72 and 74 in the region where gusset fold 44 and side portions 16 are heat-sealed. As indicated, heat-sealing die face 72 is cut away, or relieved, to form die face 72' in the region where four thicknesses of cellular material are to be heat-sealed. Die face 74 is similarly relieved at 74'. Four thicknesses occur in this area due to the presence of gusset fold 44 and side portions 16, as indicated in FIGS. 1, 2A and 2B. The provision of relief 72' ensures that the four thicknesses are compressed sufficiently to form an adequate heat-seal across gusset fold 44 in both the toe and heel regions of the slipper; and two thicknesses are compressed sufficiently to form an adequate seal in the remaining portions of toe seam 22 and heel seam 34 which lie above the location of gusset fold 44. A relief of 0.002 inches has been found to be effective for this purpose, where material having an uncompressed thickness of approximately 0.250 inch is used.

FIG. 5C shows a section view taken along line 5C—5C of FIG. 5B, indicating the cooperation of the upper and lower die faces 84 and 72 with folded band of material 52 when die press 66 has closed. Lower die face 72 extends above the surface of plate 73 a distance R. In practice, 0.020 inch has been shown to be acceptable for distance R where the band material is approximately 0.250 inch thick; however, those skilled in the art will realize that this distance must be adjusted for varying thicknesses and compositions of band 52. Upwardly extending die face 72 comprises a base portion having a thickness T and an extending cutting edge 72A having a thickness $t$. A sealing ledge 72B is formed at the base of the cutting edge. In practice, it has been found that T should be approximately 0.130 inch; and $t$, approximately 0.030 inch; however, these dimensions may also be varied as necessary to suit the particular material composition and thickness. Upper die face 84 is flush with the surrounding plate 83, as indicated. When die press 86 closes to form toe and heel seams 22 and 34, upper die face 84 and the cutting edge 72A of lower die face 72 cooperate to compress, melt and cut the folded band 52. Sealing ledge 72B and upper die face 84 cooperate to form seams 22 and 34 therebetween as will be understood by those in the art. As indicated, die faces 72, 74, 82 and 84 lie in slots formed in the surrounding plates 73 and 83, to minimize heat transfer from the heated die faces to plates 73 and 83. This minimizes undesirable searing or fusing of the folded band 52 when die press 66 closes, except in the area of toe and heel seams 22 and 34.

Referring again to FIG. 5B, the function of spaced notches 140 may now be understood. As discussed with regard to FIG. 5C, the closing of die press 66 forms the toe and heel seams and simultaneously sufficiently weakens the material compressed between upper die face 84 and cutting edge 72A of lower die face 72 so that the completed slippers may be easily separated from the adjacent band material. While this condition simplifies removal of the slippers from the band material, it usually sufficiently weakens the material to cause separation between the toe and/or heel seams and adjacent scrap material before the completed slipper has been drawn through outfeed rollers 86. To prevent this, notches 140 are provided in cutting edge 72A and 74A of relieved portions 72' and 74' of both the toe and heel seam forming die faces 72 and 74. See FIG. 5A. Notches 140 ensure that a small amount of material will not be totally fused between cutting edges 72A and 74A and the upper die faces 82 and 84, thereby providing sufficient connection between each slipper and the adjacent scrap material to permit a band of completed slippers to be drawn through outfeed rollers 84. Thereafter, the slippers may be easily removed from the band by the operator.

Figure 7:
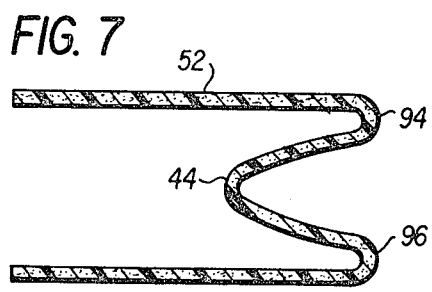
FIG. 7 shows a view taken along line 7, 8–7, 8 of FIG. 3, indicating the preferred configuration of the folded material prior to its entry into the infeed rollers.
Figure 8:
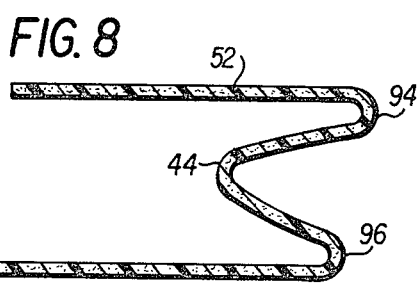
FIG. 8 shows a view taken along line 7, 8–7, 8 of FIG. 3, indicating an undesirable variation of the configuration of the folded material prior to its entry into the infeed rollers.

FIGS. 7 and 8 show the folded band of material 52 just before it enters infeed roller 64. Ideally gusset fold 44 should be symmetric as the folded band enters infeed rollers 64. However, it has been observed that the band 52 occasionally tends to shift somewhat during or after folding to assume a configuration similar to that illustrated in FIG. 8 where outer gusset fold edges 94 and 96 are out of line. As the material passes through infeed rollers 64, this misalignment usually will persist, yielding an undesirable, irregular configuration in the resulting slipper-boot, such as shown in the heel illustrated in FIG. 9. A similar configuration would exist in the toe area. While slipper-boots having such irregular heel and toe configurations may be worn, and also have many of the advantages of the slipper-boots according to the invention, the appearance of the product is irregular, which could influence its acceptability commercially. Also, it is thought that this misalignment may cause increased stresses in the heel and toe areas, which could lead to premature failure. Resolution of this problem is discussed with respect to FIGS. 10 and 13.

Figure 10:
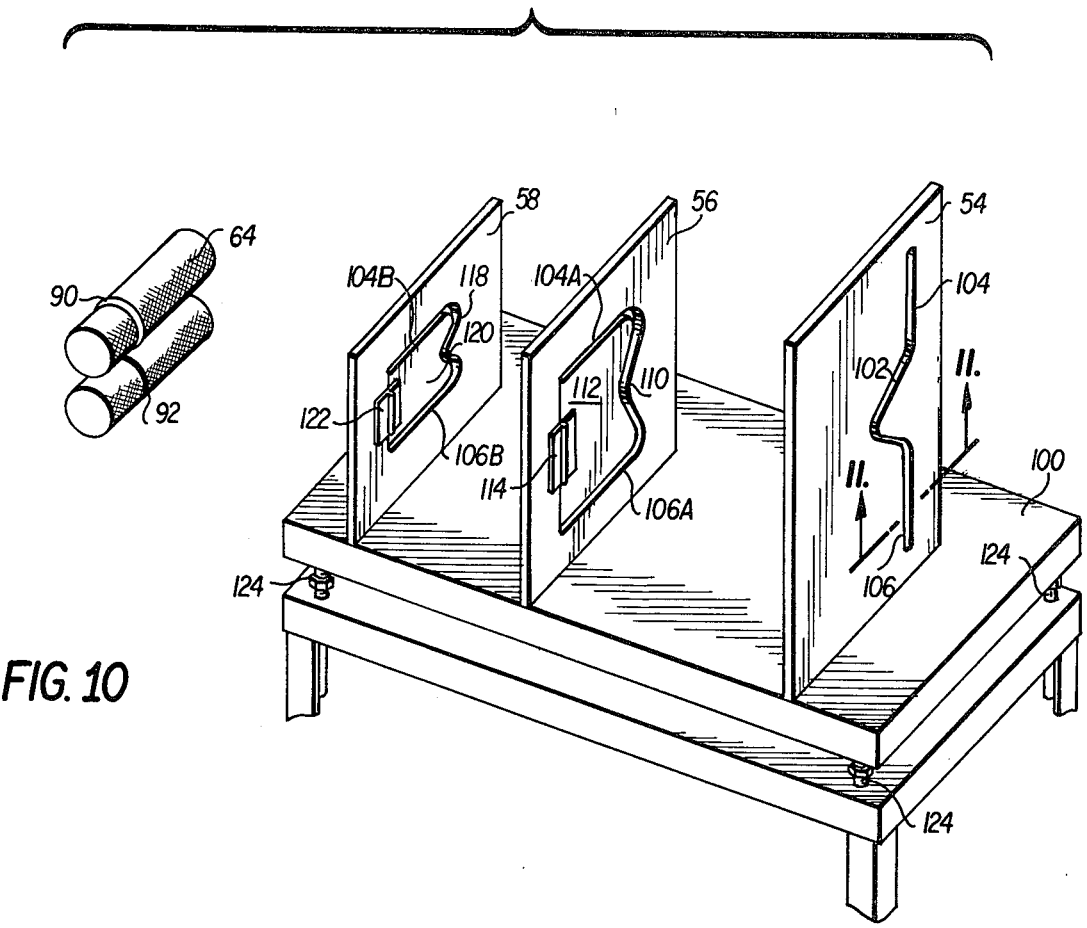
FIG. 10 shows a perspective view of the material folding apparatus according to the invention and its orientation relative to the combination infeed rollers and material trimming blade.
Figure 12:
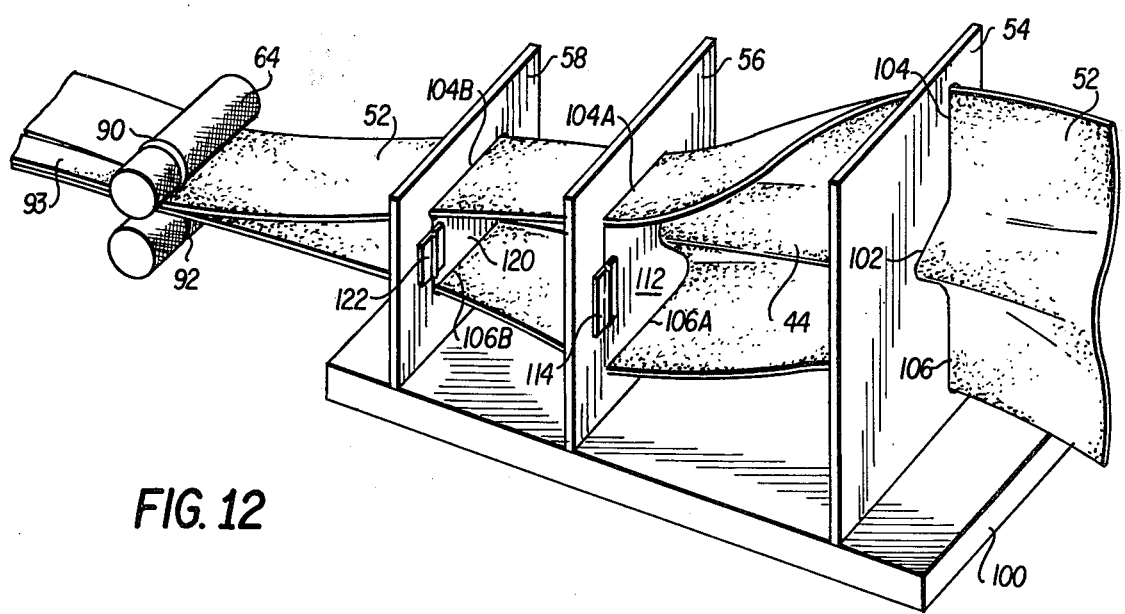
FIG. 12 shows a view corresponding to that of FIG. 10, in which the band of material has been threaded through the material folding guides.

FIGS. 10, 11 and 12 illustrate the details of folding guides 54, 56 and 58. The folding guides, which are mounted essentially vertically on a support platform 100, comprise upwardly extending flat plates of a material such as nylon. Any other material having a relatively high natural lubricity, such as well-known plastics impregnated with molybdenum disulfide may also be used. Band 52 is threaded first through guide 54 which includes a central V-shaped slot 102 having vertical extensions 104 and 106. Referring to FIG. 11, the geometry of slot 102 may be seen. Smoothly rounded edges 108 are provided which are spaced at a distance slightly wider than the thickness of the material to be used for a particular boot. This spacing minimizes stretching and snagging of the material in transit through the folding guides. Similarly, the depth and sharpness of notch 102 in folding guide 54 is chosen to minimize snagging and friction on the band 52.

Band 52 is then threaded through guide 56 which includes a central, shallower V-shaped slot 110 having lateral extensions 104A and 106A. After passing through folding guide 56, band 52 first assumes the M-shape shown in FIGS. 7 and 8. To facilitate threading band 52 through guide 58, a door 112 is hinged at 114 between lateral extensions 104A and 106A.

After passing through folding guide 56, the material is threaded through folding guide 58 which comprises a still shallower V-shaped slot 118 having longer lateral extensions 104B and 106B. Lateral extensions 104B and 106B are sized to be somewhat longer than the vertical height of side portions 16 of the slipper-boot shown in FIG. 1. The additional length of lateral extensions 104B and 106B provides the additional height necessary for trimming in infeed rollers 64 to produce parallel upper edges 32 in the completed slipper-boot. As with folding guide 56, a door 120 hinged at 122 facilitates threading the material through folding guide 58. After leaving folding guide 58, the folded band of material is then directed through rollers 64 where the edges of band 52 are trimmed to form the completely folded band having longitudinal gusset fold 44 therein.

Folding guides 54, 56 and 58 are spaced as necessary to ensure that the springy material of band 52 is not permitted to snap back to its unfolded condition between folding guides. The precise spacing may be easily adjusted and will depend upon the material used. Fewer or more folding guides could be used; but it is desirable to minimize the number of stations, since too many stations may cause undesirable stretching of the folded band 52 with a resultant loss of size control.

Figure 9:
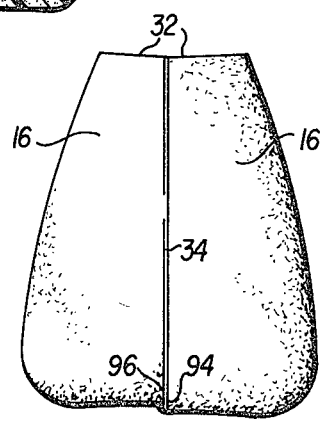
FIG. 9 shows a rear view of a slipper-boot according to the invention indicating the effect on a completed slipper of the undesirable configuration shown in FIG. 8.

As illustrated in FIG. 10, means are also provided for correcting the misalignment problem discussed with regard to FIGS. 7 to 9. In FIG. 10, support platform 100 may be adjustably mounted on simple jack bolts 124 which may be used to raise or lower opposite sides of support table 100 to twist band 52 about its axis of movement as it passes through folding guides 54, 56 and 58 and before it reaches infeed rollers 64. This twisting of the folded band biases the band; whereby, the outer fold edges 94 and 96 are maintained in alignment as they enter the infeed rollers 64.

Figure 13:
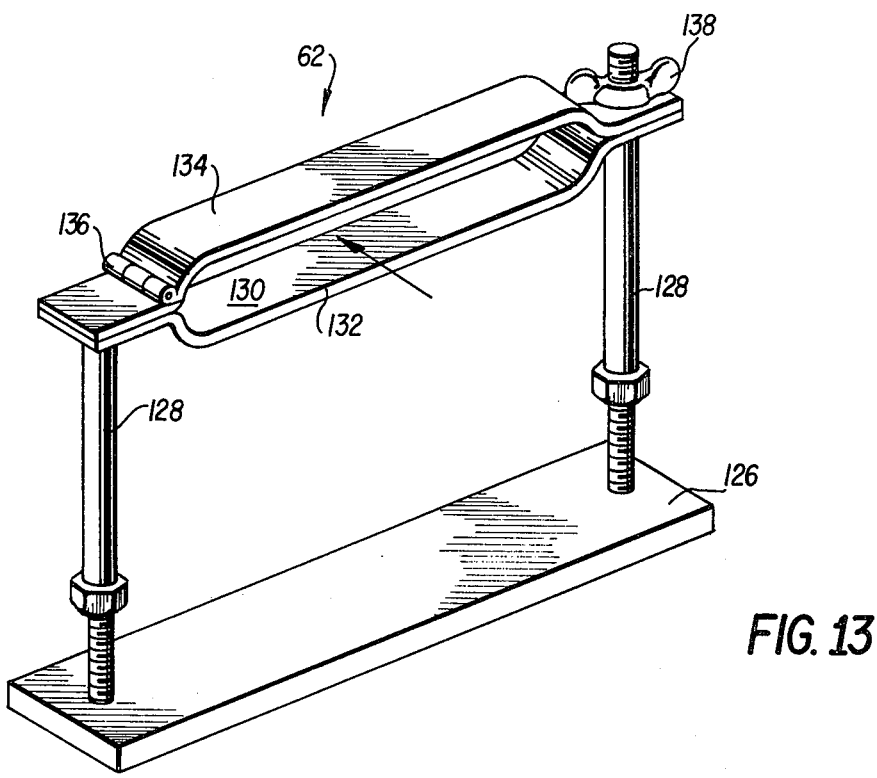
FIG. 13 shows the angularly adjustable flow guide according to the invention.

FIG. 13 illustrates an alternate means of correcting the misalignment problem discussed with regard to FIGS. 7 through 9. An angularly adjustable flow guide 62 may be provided between folding guide 58 and infeed rollers 64, as indicated in FIG. 3. If necessary, both the angularly adjustable flow guide 62 and jack bolts 124 may be used to correct this problem. Angularly adjustable flow guide 62 comprises a fixed base 126 which includes a pair of upwardly extending jack bolts 128 spaced on either side of band 52 as it leaves folding guide 58. A guide channel 130 is defined by a lower cross piece 132 attached to the upper ends of jack bolts 128 and an upper cross piece 134 hingedly attached to lower cross piece 132 at one end via hinge 136. The opposite end of upper cross piece 134 is joined to lower cross piece 132 by means such as wing nut 138. The position of the opposite ends of flow guide 130 may be adjusted as desired by adjusting the elevation of jack bolts 128. By this means, band 52 may be twisted about its axis of movement before it is drawn through infeed rollers 64, thereby maintaining the outer fold edges 94 and 96 in alignment.

In operation, the apparatus according to the invention is set in motion via synchronizing mechanism 88 which activates infeed rollers 64 and outfeed rollers 86 to draw the band of material 52 from supply roll 50, through folding guides 54, 56 and 58 and/or through angularly adjustable flow guide 62. The material is then drawn through and trimmed by infeed rollers 64 and passed through heat-sealing die press 66, after which it departs the apparatus through outfeed rollers 86. Once band 52 has been folded and drawn into die press 66, the infeed and outfeed rollers are stopped by synchronizing mechanism 88; and die press 66 is closed to form toe and heel seams 22 and 34. After the toe and heel seams have been formed, die press 66 is opened by synchronizing mechanism 88; and infeed outfeed rollers 64 and 86 are actuated to draw additional material into die press 66. After a sufficient amount of material has been drawn into die press 66 to form a slipper-boot of a desired length, the infeed and outfeed rollers are again stopped and a second pair of toe and heel seams 22 and 34 are formed. As the completed slippers leave outfeed rollers 86, they are removed from adjacent scrap material by the operator who may easily tear the bands of unfused material formed by notches 140 (FIG. 5B) between successive slipper-boots and the scrap material.

Having described our invention in sufficient detail to enable one of ordinary skill in the art to practice it, we claim:

1. A slipper-boot formed from a sheet of synthetic polymeric sheeting material, comprising an elongated seamless sole portion having forward and rear ends; generally upright side portions integral with said sole portion and extending upwardly therefrom, said side portions having forward edges, rear edges and top edges; said forward edges being joined by a toe seam extending generally upwardly and rearwardly from said seamless sole portion to a first location below said top edges and then turning to extend forwardly and upwardly to meet said top edges; said rear edges being joined by a heel seam extending generally upwardly and forwardly from said seamless sole portion to a second location below said top edges and then turning to extend rearwardly and upwardly to meet said top edges; said toe and heal seam each intersecting said upper edges at an angle when viewed from the side of the slipper and said toe and heel seams forming with said side portions and said top edges an upwardly flared foot-receiving throat with an upper opening having a first perimetral length along said top edges and with a lower opening having a second, smaller perimetral length below said top edges.

2. A slipper boot as claimed in claim 1, further comprising at least one gusset fold located lengthwise in said sole portion.

3. A slipper-boot as claimed in claim 1, wherein said toe and heel seams are heat-sealed seams fusing said front and rear edges.

4. A slipper-boot as claimed in claim 1, wherein said angle is an acute angle.

5. A slipper-boot as claimed in claim 2, wherein said toe and heel seams are heat-sealed seams fusing said front and rear edges and the opposite ends of said at least one gusset fold.

* * * * *